Jan. 15, 1952     C. SCHOONMAKER     2,582,760
TOASTER
Filed July 30, 1946
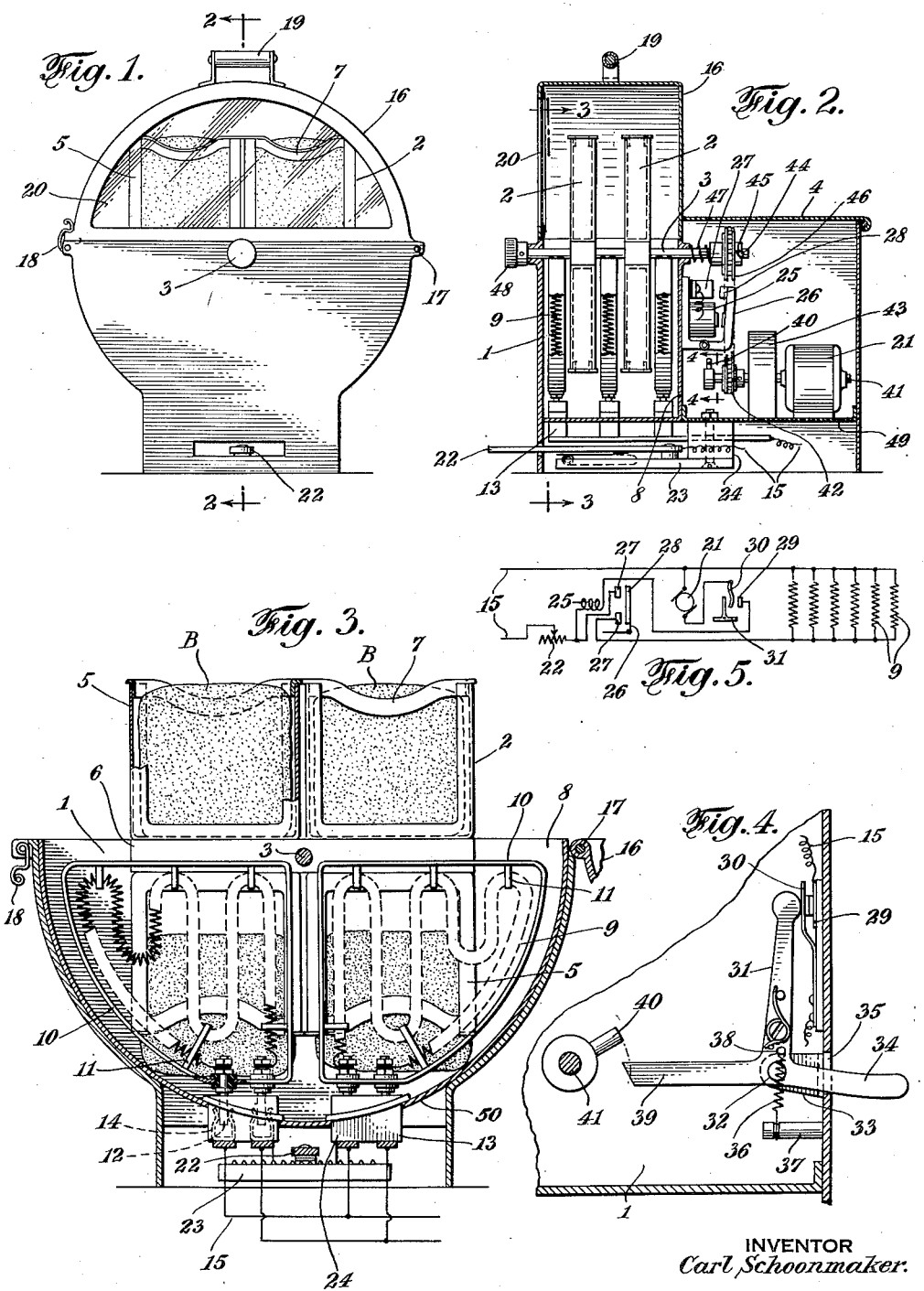
INVENTOR
*Carl Schoonmaker.*
BY
*William F. Nickel*
ATTORNEY Patented Jan. 15, 1952

2,582,760

UNITED STATES PATENT OFFICE 2,582,760

TOASTER

Carl Schoonmaker, New York, N. Y.

Application July 30, 1946, Serial No. 687,142

3 Claims. (Cl. 99—391)

This invention is an improvement in toasters; and more particularly an apparatus wherein bread is adapted to be heated and browned by the effect of an electric current.

An object of the invention is to provide a unit constructed to receive several pieces of bread and to contain a number of heating elements to which both sides of each piece are exposed at once; the bread and the heating elements being supported to be relatively movable so that, should the heating effect of the electric current not be uniform but greater at one point than at another, the toasting operation is still uniform and even in its results, and the slices of bread are browned over their entire surfaces to the same extent.

A further object of the invention is to provide a toasting unit so designed that the toasting operation is performed infallibly and quickly and is limited strictly to the time necessary to give a good toasting effect, and then stopped so that the slices can be removed and fresh slices substituted.

An additional object of the invention is to provide a toasting apparatus electrically operated and having a controlling circuit closing switch designed to be actuated by moving parts to break the electrical supply circuit so that the toasting process continues for a predetermined interval only and then ends; the switch being capable of then restoring the circuit, so that the cycle is resumed.

Another object of the invention is to provide a toasting machine so constructed that the operation thereof can be repeated as often as necessary without disturbing the adjustment of the parts by which correct functioning is obtained.

A still further object is to provide a toaster which gives complete visibility during the toasting operation, so that the slices of bread can be observed from start to finish.

Yet another object is to provide a toaster having suitable regulating means whereby the extent and quality of the toasting can be adjusted, to make the toast browner or less brown; that is, lighter, as desired.

These and other objects and advantages of the invention are fully explained in the following description and the novel features are defined in the appended claims. But this disclosure is explanatory only and various changes may be made without departing from the general meanings of the broad terms in which the claims are expressed.

In the drawings:

Figure 1 is a side view of my improved toaster;

Figure 2 is a vertical section thereof taken on line 2—2 of Figure 1;

Figure 3 is a vertical section thereof taken on the line 3—3 of Figure 2;

Figure 4 is a view of the electric circuits which supply the power to operate the toaster; and Figure 5 is an outline of the electrical circuits and controlling means for same.

The toaster comprises a casing 1, in which two or more vertical carrier frames or receiving members 2 are mounted to be rotated by means of a horizontal shaft 3. The front part of the casing 1 is substantially cylindrical, as indicated in Figures 1 and 3, and the rear part is semi-cylindrical, with a flat top 4, just above the level of the shaft 3; as illustrated in Figure 2. The shaft 3 is housed mostly in the front part of the casing; and so are the frames 2 thereon. These frames are each made up of four U-shaped elements or sections 5, arranged side by side in two pairs; the pairs being disposed with bases adjacent, one pair being affixed along their bases by welding or otherwise to one side of a bar or crosspiece 6; and the other pair to the opposite side of said bar, through the center of which the shaft 2 passes and is made rigid therewith. The elements 5 consist of metal channel bars, bent into shape, and forming receptacles or pockets into which slices of bread to be toasted can be slipped at the ends remote from the bar 6. The edges of the pieces of bread are received in the channels which are open at said ends; and across said ends of the elements 5 are strips 7 between which the bread is slipped into the members 2. The slices of bread indicated at B cannot fall out of the members, even though they sing a little in the lower half of their revolution, and rub along the curved bottom of the casing below them. But the slices can move a little loosely up and down and from side to side in the channels of the elements 5 as the frames 2 revolve with the shaft 3.

The cylindrical front part of the casing 1 is divided from the semicylindrical rear part by an internal partition 8, which supports the inside bearing of the shaft 3; the other bearing being mounted in the forward face of the casing 1. Between this face and the partition 8 are the heating elements 9, each having the form of a length of spirally coiled wire, bent upon itself and mounted in a quadrant-shaped frame 10. The heating conductors 9 are disposed within the frames 10 so as to fill as much of the space enclosed by the frames as possible; and are mounted on loops or hooks 11 on the inner edges of the frames. The frames 10 and the wires 9 within them are arranged in pairs; the elements of each pair lying in one transverse plane within the lower half of the cylindrical front part of the casing 1; and the several pairs being separated by intervening spaces as shown in Figure 2. Each of the members 2 thus revolves between heating elements adjacent both faces thereof.

The central angle of each frame 10 lies adjacent the shaft 3 and the lower part of each frame 10 carries a pair of insulated binding posts 12 to which the terminals of the heating coil are affixed. The lower ends of the posts 12 may be flattened or tongue-shaped, and these extremities project to the outside of the frame and are thrust into openings in the tops of insulating members 13, secured in the bottom of the casing below each pair of binding posts, and projecting through said bottom to the outside of the casing. Within each insulating member 13 are two pair of leaf spring contacts or prongs, between which of the separate pairs the lower ends of the posts 12 are received to make electrical contact with electrical supply conductors 15 connected to the prongs 14. The frames 10 and elements 9 are light and can easily be detached and removed for inspection or replacement simply by pulling the posts 12 out of the insulating members 13 and lifting the frames 10 out. As will appear from Figure 5, the separate heating wires 9 are joined in multiple across the supply wires 15.

The upper half or cover 16 of the cylindrical front part of the casing is hinged to the lower half, as shown at 17, and its opposite extremity has a projection to be engaged and held down by a pivoted catch 18. At the top, the casing 16 has a handle 19. The front side of the cover 16 has a heat resistant glass window 20.

To revolve the shaft 3 and members 2, the motor 21 is set up within the casing 1 and geared to the shaft 3. This motor is supported on the bottom of the cylindrical or rear part of the casing and is controlled by a switch 22, which projects to the front of the casing through a slot in the lower part thereof. This switch cooperates with a rheostat or the like, and is pivoted on a support 23 of insulation, affixed to the lower or outer face of the bottom of the rear of the casing by a bolt or screw or other suitable means and separated therefrom by a spacing block 24. The switch arm 22 cooperates with contacts and resistances in parallel on the support 23 to adjust the speed of the motor, the toast being done to a light brown at higher speed; and a deeper brown at lower speed.

In circuit with the motor 21 and mounted on the adjacent face of the partition 8 is a relay coil 25, having a pivoted armature 26. This armature is of suitable material and it bridges a pair of terminals 27 in the main circuit by means of an insulated conductor strip 28 on its free end. This constitutes a switch that is preferably a knife switch; but a switch with carbon contacts may also be utilized. In the casing 1 adjacent the motor I further mount a fixed terminal 29 in the motor circuit (see Figure 4), and a metal leaf spring bearing a contact 30 to engage the terminal 29. Both of these terminals may also be carbon. The spring terminal 30 is normally set to be separated from the terminal 29; but can be moved against the terminal 29 by the vertical arm 31 of a lever mounted on a pivot 32. This pivot is supported in bearing projections 33 in the casing; and the lever has another arm 34 which projects out through an aperture 35 at one side of the casing. A spiral spring 36 is anchored at one end to a stud 37 below the pivot 32 in the casing and at the other to a stud 38 on the lever arm 31, just above the pivot 32. This spring is an off-center spring and holds the arm 31 in position to press the leaf spring contact 30 against the contact 29; or away from this contact as far as the arm 34 is permitted to move by the upper edge of the aperture 35. If the arm 34 is depressed, the contact 30 is pressed against the contact 29 and is held in this position till the arm 31 is actuated to release the leaf spring 30. This operation is effected by a projection or third arm 39 integral with the arms 31 and 34, being engaged by a part such as a stud 40 affixed to the shaft 41 of the motor 21 and revolving therewith. The gearing between the motor and the shaft 3 may be of any suitable type as indicated at 42.

In practice, the frames 2 are loaded with slices of bread, and then the arm 34 is depressed to engage the contacts 29 and 30, the switch 22 being first adjusted for fast or slow operation to close the motor circuit, and the motor begins to revolve. The coil 25 now is energized, attracting the armature 25 and closing the circuit for the heating elements 9. The pieces of bread are revolved as often as necessary between the heating wires, and are evenly toasted on both sides thereof. But as soon as the projection 40 on the motor shaft 41 strikes against the arm 39, the motor circuit is opened and both the motor and the shaft 3 stop. Then the circuit of the elements 9 is also broken and the toast is taken out.

The motor 21 actuates the shaft 3 through suitable reduction gearing indicated at 43. The driven gear 46 on the shaft 3 operates against a pin 44 which is on the shaft 3 and is received in a recess 45 in the hub of said gear; this recess having an abrupt side and an inclined side; so that the gear 46 can turn the shaft 3 in one direction only; to wit, downward on the side towards the observer in Figure 2. A spring 47 on the shaft between the partition 8 and the gear 46 holds the hub of said gear in engagement with the pin 44. If therefore the knob 48 on the front or outer end of the shaft 3 is grasped and the shaft 3 turned in the same direction, the pin 44 slips out of the recess 45 because the inclined side of the recess 45 acts as a cam and slides the gear 46 along the shaft 3 towards the partition 8 against the force of the spring 47. The shaft 3 is thus freed from the gear 46. Hence, as soon as the motor stops when the toasting is finished, the attendant frees the catch 18; and takes hold of the handle 19 to raise the cover 16. The knob 48 can now be utilized to bring all the toast within reach to be removed from the casing. Meanwhile, the motor shaft 41 and all parts of the reduction gearing 43 remain motionless. As soon as the motor starts again, the pin 44 slips back into the recess as the gear 46 rotates. The stud 40 thus retains its proper position and at the end of the next operation, it will actuate the switch arm 39 at the right instant as before to break the motor circuit and stop the latter. If attempt is made to turn the knob the other way, the shaft is held motionless by the motor and gearing 43.

Usually one revolution of the part or stud 40 is sufficient to define the toasting interval, while the shaft 3 may be given one or more revolutions in this interval as required. The gearing 43, the wires 9, and the connections between the shaft 3 and the shaft bearing the stud 40 may be designed accordingly.

After the stud 40 breaks the circuit of the motor, the latter can be started again by depressing the arm 34.

The semicylindrical part of the casing has a raised bottom 49 on which the motor rests, and the cylindrical part is open at the lower end, but the lower half thereof has an inside insulator or shell lining 50 which carries the insulator members 13. This lining also covers the front of the casing and the adjacent face of the partition 8.

The toast in the casing remains warm till taken out, as long as the top 16 is in place. During busy hours the cover can be kept in open position. In operation, the movement of the slices towards the heating elements and then away gives the so-called "receding heat" effect, well known to chefs, as the cause of excellent finishing touches to all cooked viands.

The entire unit is simple in construction, comparatively inexpensive to produce, and of large capacity. It can be built to take more or fewer slices of bread, and in any size it can be operated by connecting it with a flexible conductor to any ordinary electrical outlet in a domestic or commercial building.

The part 40 and the contacts 29 and 30, with associated elements constitutes a reliable time switch that limits the operating interval, and works infallibly without clockwork to give the desired result.

This switch is operated automatically when engaged by the part 40. By pulling the switch to close the contacts 29 and 30 the toaster is set working at once.

Having described my invention, what I believe to be new is:

1. A toaster comprising a casing open at the top, a transverse shaft supported at the top of said casing, the bottom of the casing being substantially semi-cylindrical with respect to the axis of the shaft, quadrant shaped frames supported in the casing with their curved sides adjacent the bottom side, the frames being at both sides of said shaft, heating conductors supported in said frames, the latter having binding posts to which the conductors are attached, insulators bearing terminals mounted in the bottom of the casing engaging said binding posts, a bar mounted on the shaft offset from the plane of said frames, and U-shaped receiving members comprising channel bars disposed side by side and base to base and secured to said bar, said shaft being rotatable to move said receiving members past the heating element.

2. A toaster comprising U-shaped channeled receiving members disposed side by side and base to base, heating elements including wires and supporting frames wherein said wires are mounted, said elements having spaces between them to receive said members, a semi-cylindrical casing having a curved bottom and open top enclosing said members and said elements, insulators bearing terminals mounted in the casing, binding posts having projecting extremities on said frames, united to said wires and received in said insulators and detachably engaging said terminals, a central transverse shaft at the top of the casing, said members being rigidly affixed to said shaft to revolve therewith between said heating elements, and a motor to revolve said shaft and said members.

3. A toaster according to claim 2 wherein gear connections are mounted between the motor and, one end of the shaft and include a one-way driving coupling, the opposite end of the shaft having a knob for turning the same by hand independent of said connections.

CARL SCHOONMAKER.

REFERENCES CITED

The following references are of record in the file of this patent:

UNITED STATES PATENTS

| Number | Name | Date |
|---|---|---|
| 1,471,275 | Moneuse | Oct. 16, 1923 |
| 1,477,343 | Griffin | Dec. 11, 1923 |
| 1,631,655 | Sunderland et al. | June 7, 1927 |
| 1,634,142 | Hammond | June 28, 1927 |
| 1,731,742 | Harrison | Oct. 15, 1929 |
| 1,733,766 | Wilkowski | Oct. 29, 1929 |
| 1,797,628 | Whiting | Mar. 24, 1931 |
| 1,993,607 | Kalgren | Mar. 5, 1935 |
| 2,038,028 | DeMatteis | Apr. 21, 1936 |
| 2,168,773 | Parr | Aug. 8, 1939 |
| 2,224,483 | Merrill | Dec. 10, 1940 |
| 2,243,993 | Watson | June 3, 1941 |
| 2,410,985 | Malmquist | Nov. 12, 1946 |

FOREIGN PATENTS

| Number | Country | Date |
|---|---|---|
| 107,810 | Australia | Jan. 20, 1937 |